Colwell & Baird,
Resawing Machine.
N° 44,606. Patented Oct. 11, 1864.

Witnesses
James J. Johnston
A. B. Johnston

Inventor:
W. S. Colwell
Willis Baird

UNITED STATES PATENT OFFICE.

WILLIAM S. COLWELL, OF PITTSBURG, AND UTILLES BAIRD, OF ALLEGHENY, PENNSYLVANIA.

IMPROVEMENT IN SAW-MILLS.

Specification forming part of Letters Patent No. 44,606, dated October 11, 1864.

*To all whom it may concern:*

Be it known that we, WILLIAM S. COLWELL, of Pittsburg, and UTILLES BAIRD, of Allegheny city, in the county of Allegheny and State of Pennsylvania, have invented a new and useful Improvement in Feed Apparatus for Resawing-Mills; and we do hereby declare that the following is a full and exact description thereof, reference being had to the accompanying drawings, and to the letters of reference marked thereon.

The nature of our invention consists in a mechanical arrangement of the driving-gear, springs, and feed-rollers of resawing-mills, arranged so that any desired speed and pressure may be given to the feed-rollers, the whole being constructed, arranged, and operating in the manner hereinafter described.

To enable others skilled in the art to make and use our invention, we will proceed to describe its construction and operation.

Figure 3:
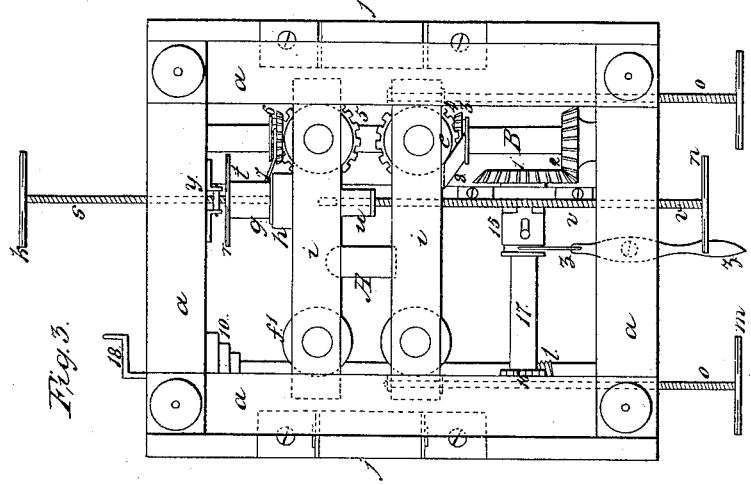
Figure 2:
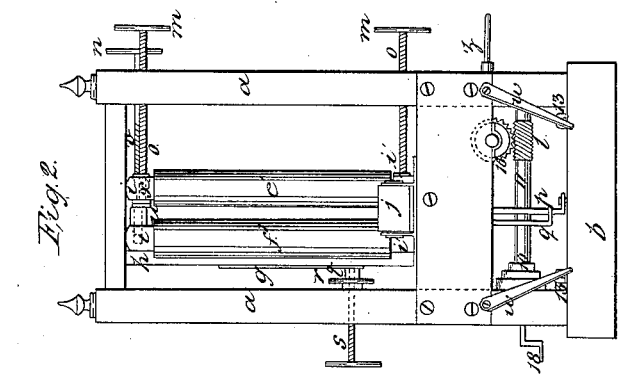
Figure 1:
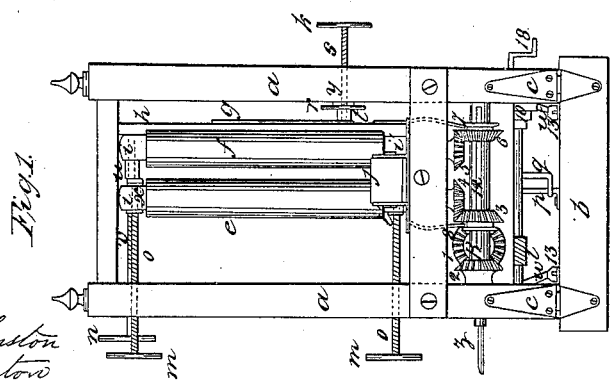

In the accompanying drawings, Figure 1 represents a front view of the feed apparatus. Fig. 2 represents a back view of the same. Fig. 3 represents a top view of the same.

In the accompanying drawings, *a* represents the frame, which is constructed in the ordinary manner.

*b* represents the floor on which the apparatus rests. The feed apparatus is arranged in front of any resawing-mill, with the side represented in Fig. 2 facing the saw. The frame is then secured to the floor by means of the hinges *c*, and hasps, staples, and keys (marked 13).

*w* represents springs, which are used for the purpose of holding the keys in the staples. The keys should be made wedge form, for the purpose of drawing the frame down firmly to the floor. By thus securing the frame to the floor in front of the saw the apparatus may be turned back for the purpose of allowing room for sharpening or changing the saw, and then brought back to its place, bringing the apparatus always into proper juxtaposition to the saw, thereby saving much of the time and trouble consumed by the old mode of resetting the feed apparatus.

*p* and *q* represent guys, which are used for preventing the apparatus from being thrown back too far. The manner of constructing these guys is clearly shown by reference to Figs. 1 and 2.

10 represents a cone-pulley, on which is placed the driving-belt. The pulley 10 is secured to shaft 11, on which is an endless screw, *l*, which gears into wheel 16 on shaft 17. (See Figs. 2 and 3.) On the front end of shaft 17 is placed wheel 1, which gears into wheel 2. On shaft B are placed wheels 3 and 6, which gear into wheels 4 and 5, placed on the lower ends of the rollers *e* and *f*. The wheels 3 and 6 are moved back and forward on the shaft B by means of conductors or leaders 7 and 8, which fit into a groove in the hub of the wheels 3 and 6, which are prevented from turning on the shaft by means of a tongue, 12, running lengthwise of the shaft. This tongue is also fitted to a groove made in the bore of the wheels 3 and 6. The conductor or leader 8 is secured to the support *i'* on the left of the apparatus, and the conductor or leader 7 is secured to the piece *h*, which is connected to the supports *i* and *i'* on the right of the apparatus. It will readily be observed that by thus arranging and securing the conductors or leaders 7 and 8 in relation to the wheels 3 and 6, these wheels will move back and forward on the shaft B, and always keep in gear with the wheels 4 and 5 on the lower ends of the feed-rollers *e* and *f*.

On the outer face of the piece *h* is placed a strip, *g*, which is furnished with slots, so that it may be raised or lowered and secured in the desired position by means of set-screws. In the strip *g* is secured the inner end of the screw *s*, which works in a swivel-nut, *y*, which is mounted on suitable bearings, which are secured to the frame *a*. (See Fig. 3.) Around the end of the screw *s* is placed a gum or spiral spring, *t*, the pressure of which is regulated by means of the disk *r*. On the outer end of the screw *s* is placed a hand-wheel, *k*, for operating it. The disk *r* is furnished with a screw-thread corresponding to the thread on the screws *s*. By turning this disk the spring *t* is pressed or forced against or relieved from pressing against the piece *h*. By this arrangement of the piece *h*, strip *g*, swivel-nut *y*, disk *r*, and spring *t* any desired pressure may be brought to bear on the rollers *f* and *f'*, and the pressure of the spring *t* placed central to the stuff between the rollers. The upper end of the rollers $e$ $e'$ and $f$ $f'$ are held in the desired position by the supports $i$ $i$, and the lower ends are held in position by the supports $i'$ $i'$. The part of the supports which comes in contact with the frame $a$ is made round, forming a segment of a circle, and the supports of the rollers $e$ and $e'$ are furnished with V-shaped recesses, which are indicated by dotted lines, (marked $x$.) These recesses allow the rollers to be placed out of a perpendicular line or position without throwing any strain on the screws $o$, used for regulating the position of the rollers. The screws $o$ are furnished with hand-wheels $m$, for operating them, and constructed in the ordinary manner. The position of the rollers $f$ and $f'$ is controlled by means of the screw $s$, which will, by turning it, force against the piece $h$, which will force the rollers $f$ and $f'$ toward or draw them from the stuff or article placed between them and rollers $e$ and $e'$. The screw $v$ works in a nut placed in the support $i$ on the left of the apparatus, and is furnished with a hand-wheel, $n$, for operating it. On the inner end of the screw $v$ is placed a gum or spiral spring, $u$, which is used in connection with the screw $v$ for holding the upper end of the rollers $f$ and $f'$ in a position corresponding to the position of the rollers $e$ and $e'$ or the form of the stuff placed between the rollers, and also for preventing the rollers $f$ and $f'$ from tilting over against the rollers $e$ and $e'$ when feeding up to the saw narrow stuff.

$j$ represents ordinary friction-rollers, which are mounted on suitable bearings, which are secured to the frame $a$.

A represents a bracket, which is secured to one of the supports $i'$, and should be so arranged as to be easily raised or lowered to correspond to the height of the friction-rollers $j$, and is used for the purpose of preventing the stuff from dropping or tilting below the feed-line or top of the friction-rollers $j$.

We wish it clearly understood that we do not confine ourselves to any particular form, size, or mode of constructing the various parts herein described. All of these things we leave to the skill and good judgment of the mechanic skilled in the art of constructing feed apparatus for resawing-mills.

The operation of our improvement is as follows: Having all things arranged and constructed as herein described and represented, and having the feed apparatus secured to the floor in front of the saw in the manner and by the means herein described and represented, we then arrange the driving-belt on the cone-pulley 10 in accordance with the speed desired. By imparting motion to pulley 10 or crank 18 motion is imparted to the endless screw $l$, which will revolve the wheel 16, which revolves shaft 17, which will, when the coupling 15 is shipped, revolve the wheel 1, which will revolve wheel 2, which will revolve shaft B, which revolves wheels 3 and 6, which will revolve wheels 4 and 5, and thereby impart motion to the rollers $e$ and $f$, which will feed the stuff placed between up to the saw.

When room is desired for the purpose of changing or sharpening the saw, the springs $w$ are moved sidewise and the keys driven out of the staples. The feed apparatus is then tilted back, the guys $p$ and $q$ preventing it from going beyond a given point.

The feed apparatus is made operative or inoperative by shipping or unshipping the coupling 15 by means of lever $z$.

It will be observed that by the use of the cone-pulley 10 and endless screw $l$, in connection with the peculiar arrangement of the wheels 16, 1, 2, 3, 4, 5, and 6, we are enabled to impart any desired motion to the feed-rollers by simply changing the position of the driving-belt on the cone-pulley 10, which will, according to the position of the belt on the pulley, increase or diminish the speed of the endless screw $l$, which will in turn increase or diminish the speed of the wheels 16, 1, 2, 3, 4, 5, and 6, and thereby increase or diminish the speed of the feed-rollers; and it will also be observed that by the peculiar arrangement of the screw $s$, swivel-nut $y$, disk $r$, spring $t$, and strip $g$, and by the use of the screw $v$ and spring $u$ we are enabled to bring any desired pressure of the rollers on the stuff placed between them, and hold the rollers in a line corresponding with the stuff, and cause the rollers to act and be held in the desired position equally well in resawing wide or narrow stuff.

Having thus described the nature, construction, and operation of our improvement, what we claim as of our invention is—

1. The arrangement of the cone-pulley 10, endless screw $l$, wheels 16, 1, 2, 3, 4, 5, and 6, leaders 7 and 8, and rollers $f$ and $f'$, constructed, arranged, and operating substantially as herein described, and for the purpose set forth.

2. The arrangement of the screw $s$, swivel-nut $y$, disk $r$, spring $t$, strip $g$, screw $v$, and spring $u$, when used in connection with the rollers $f$ and $f'$, as herein described, and for the purpose set forth.

WILLIAM S. COLWELL.
UTILLES BAIRD.

Witnesses:
JAMES J. JOHNSTON,
A. C. JOHNSTON.